Sept. 8, 1953 C. W. RICH 2,651,757
MODULATION CONTROL CIRCUITS FOR MODULATED CARRIER WAVE TRANSMITTERS
Filed June 26, 1951
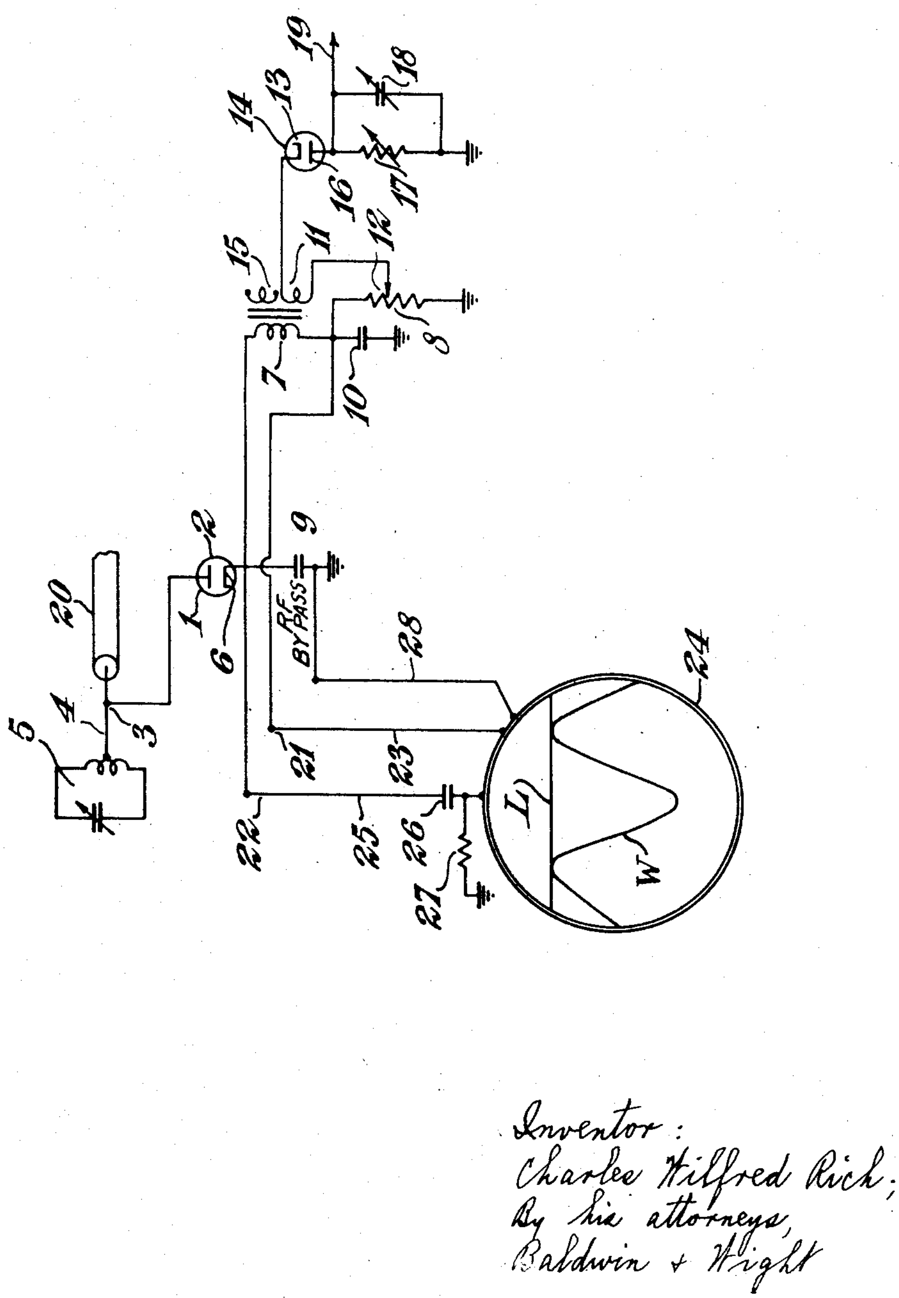
Inventor:
Charles Wilfred Rich;
By his attorneys,
Baldwin + Wight Patented Sept. 8, 1953

2,651,757

UNITED STATES PATENT OFFICE 2,651,757

MODULATION CONTROL CIRCUITS FOR MODULATED CARRIER WAVE TRANSMITTERS

Charles Wilfred Rich, Chelmsford, England, assignor to Marconi's Wireless Telegraph Company Limited, London, England, a company of Great Britain Application June 26, 1951, Serial No. 233,552
In Great Britain July 7, 1950

5 Claims. (Cl. 332—38)

This invention relates to modulation control circuits for modulated carrier wave transmitters and has for its object to provide improved and simplified control circuits whereby the depth of modulation may be automatically prevented from exceeding a predetermined value.

One of the difficulties commonly experienced with modulated carrier wave transmitters, especially for telephony, is that large modulation inputs may cause the modulation factor (the ratio of modulation frequency voltage to rectified carrier voltage) to exceed a predetermined "safe" value and it is common practice to provide automatic gain control circuits to prevent this occurring. The present invention seeks to provide improved automatic control circuits for this purpose. The advantages achieved by the invention will be enumerated later.

According to this invention an automatic modulation control circuit arrangement for a modulated carrier wave transmitter comprises a first rectifier circuit fed from a point in said transmitter where the modulated carrier appears, said rectifier circuit including a rectifier load having a portion across which modulated frequency voltage appears and a portion across which rectified carrier voltage appears, a second rectifier circuit including a load, means for superimposing the voltages derived from said portions and applying the resultant as so-called delay voltage for the second rectifier circuit, and means for taking off voltage from the load of the second rectifier circuit and utilizing it to control the modulation of the transmitter.

Preferably the voltage derived from the portion in which rectified carrier voltage appears is adjustable.

The invention is illustrated in the accompanying drawing which shows diagrammatically one embodiment.

Referring to the drawing the anode 1 of a first diode 2 is connected at 3 to the output tap or feeder connection 4 from the tank circuit 5 of a modulated carrier telephone transmitter (not otherwise represented) to be controlled and the cathode 6 is connected to earth through an audio transformer primary 7 in series with a resistance 8. A radio frequency by-pass condenser 9 is connected between the cathode 6 and earth and an audio frequency by-pass condenser 10 is connected across the resistance 8. Audio frequency voltage will accordingly appear across the transformer primary 7 and rectified carrier frequency voltage will appear across the resistance 8. The transformer, which may conveniently have a step-down turn ratio of, say 1.5, to 1, has a secondary 11 connected at one end to a tap 12 on the resistance 8—this tap is preferably adjustable and is so indicated—and at the other end to the cathode 13 of a second diode 14. The transformer may, if desired, have a further secondary 15 for other purposes but as the present invention is not concerned with this, nothing is shown connected thereto. The anode 16 of the diode 14 is connected to earth through a load resistance 17 which may be shunted by a further condenser 18 as indicated. The resistance 17 and/or the condenser 18 may, if desired, be adjustable to give control of the "attack" and decay time constant characteristics of the circuit. Voltage from the "live" end of the resistance 17 is fed out over wire 19 and employed, in any manner well known per se and therefore not illustrated, to control the modulation depth e. g. by controlling the gain of the normally provided modulation amplifier (not shown) of the transmitter.

With this arrangement if the audio voltage across the transformer secondary 11 exceeds that between the tap 12 and earth the diode 14 will conduct and a voltage will be set up in its load resistance 17 thus producing the required control action. As will be apparent, the operating point of the circuit is determined by the voltage at the tap 12 on the resistance 8.

Apart from its obvious simplicity and lightness, which makes the arrangement very suitable for use in airborne equipment, the invention presents the advantage that it will present the modulation factor exceeding a desired predetermined adjusted value independently of input voltage or grid drive resulting in a change of input power to the modulated stage of the transmitter, or of general variations of voltage supplies such as are commonly experienced in mobile equipment. Further the audio frequency voltage of one side band, and the rectified carrier voltage, are made directly available and can be displayed on a double beam oscilloscope cathode ray tube, thus giving a direct check on modulation depth which is independent of carrier amplitude. Such a display may also be used to give an accurate indication of linearity of modulation by observing the relative amplitudes of the positive and negative peaks of modulation as measured from the zero modulation line. Output power from the transmitter can also be measured by terminating the transmitter output feeder 20 by a suitable resistance (not shown) and calculating the R. M. S. of the D. C. voltage (E), the power being given by the expression $$\frac{E^2}{R}$$

One way of operating a visual cathode ray tube indicator for the foregoing purposes is also indicated in the figure. Here the opposite ends of the transformer primary 7 are brought out to terminals 21, 22 which may be marked "visual display terminals." One of these (21) is connected over lead 23 to one of the plates of one "Y" deflector plate system (not shown) of a double beam tube (represented only by its screen at 24) and and the other (22) is connected over lead 25 to one of the plates of the other "Y" deflector plate system thereof. The connection—as shown the connection 25—from the diode cathode end of the primary 7 includes a condenser 26 the output side of which is connected to earth through a suitable resistance 27. The remaining "Y" plates (two) are earthed through lead 28. The indication given by the tube will consist of a wave such as W representing the audio-voltage and a straight line L parallel to the wave axis (which is the no signal line) and representing the rectified carrier. Obviously display tube arrangements other than of the double beam tube type could be employed, if preferred, or suitable meters could be used instead of display tubes.

I claim:

1. In a modulated carrier wave transmitter an automatic modulation control circuit arrangement comprising a first rectifier circuit fed from a point in said transmitter where the modulated carrier appears, said rectifier circuit including a rectifier load having a portion of high impedance to the modulated frequency component of the rectified modulated carrier and very low impedance to the rectified carrier component thereof and a portion of high impedance to said rectified carrier component and very low impedance to said modulating frequency component, a second rectifier circuit including a load, means for superimposing voltages derived from said portions and applying the resultant as so-called delay voltage for the second rectifier circuit, and means for taking off voltage from the load of the second rectifier circuit and utilising it to control the modulation of the transmitter.

2. Apparatus as claimed in claim 1 wherein the voltage derived from the portion in which rectified carrier component appears is adjustable.

3. An arrangement as claimed in claim 1 wherein the load in the second rectifier circuit includes capacity and resistance components at least one of which is adjustable.

4. In a modulated carrier wave transmitter an automatic modulation control circuit arrangement comprising a series circuit including a rectifier, an inductance and a resistance connected to a point in said transmitter where modulated carrier appears, a radio frequency by-pass circuit connected across the series connected inductance and resistance, a modulation frequency by-pass circuit connected across said resistance, a second rectifier, a load resistance in series therewith, means for superimposing and applying to said second rectifier a voltage proportional to the voltage set up across said inductance and a voltage proportional to that set up across the first mentioned resistance, and means for taking off voltage from said load resistance and utilising it to control the modulation of the transmitter.

5. In a modulated carrier wave transmitter an automatic modulation control circuit arrangement comprising a series circuit including a rectifier, an inductance and a resistance connected to a point in said transmitter where modulated carrier appears, a radio frequency by-pass circuit connected across the series connected inductance and resistance, a modulation frequency by-pass circuit connected across said resistance, a second rectifier, a load resistance in series therewith, means for superimposing and applying to said second rectifier a voltage proportional to the voltage set up across said inductance and an adjustable voltage proportional to that set up across the first mentioned resistance, and means for taking off voltage from said load resistance and utilising it to control the modulation of the transmitter.

CHARLES WILFRED RICH.

References Cited in the file of this patent

UNITED STATES PATENTS

| Number | Name | Date |
|---|---|---|
| 2,212,568 | Kramer et al. | Aug. 27, 1940 |